(12) United States Patent
Nagaya et al.

(10) Patent No.: US 12,384,316 B2
(45) Date of Patent: Aug. 12, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Aichi-ken (JP)

(72) Inventors: Kentaroh Nagaya, Toyota (JP); Yosuke Kimura, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 393 days.

(21) Appl. No.: 18/190,120

(22) Filed: Mar. 27, 2023

(65) Prior Publication Data

US 2023/0382337 A1 Nov. 30, 2023

(30) Foreign Application Priority Data

May 25, 2022 (JP) ................... 2022-085464

(51) Int. Cl.
*B60R 21/0132* (2006.01)

(52) U.S. Cl.
CPC ............... *B60R 21/0133* (2014.12); *B60R 2021/01322* (2013.01)

(58) Field of Classification Search
CPC ...... B60R 21/0133; B60R 2021/01322; G06N 20/00; G07C 5/08; G08G 1/16
See application file for complete search history.

(56) References Cited

U.S. PATENT DOCUMENTS

| | | | |
|---|---|---|---|
| 2005/0107933 A1 | 5/2005 | Kuroda et al. | |
| 2020/0365018 A1* | 11/2020 | Arai | H04Q 9/00 |
| 2020/0382926 A1 | 12/2020 | Neyama et al. | |

FOREIGN PATENT DOCUMENTS

| | | |
|---|---|---|
| JP | 2005-170370 A | 6/2005 |
| JP | 2017-10279 A | 1/2017 |
| JP | 2020-194421 A | 12/2020 |

\* cited by examiner

*Primary Examiner* — Yuen Wong
(74) *Attorney, Agent, or Firm* — HAUPTMAN HAM, LLP (57) ABSTRACT

The information processing device includes: an acquiring unit that acquires vehicle information including an acceleration of a vehicle and a detection time at which the acceleration is detected; a deriving unit that derives an amount of change of the acceleration per unit time using the vehicle information; a setting unit that sets a threshold value of the amount of change corresponding to an interval at which the acceleration is detected using the detection time; and an extracting unit that extracts the vehicle information corresponding to the amount of change as target data when the amount of change is equal to or larger than the threshold value.

8 Claims, 8 Drawing Sheets

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-085464 filed on May 25, 2022, incorporated herein by reference in its entirety.

BACKGROUND

1. Technical Field

The present disclosure relates to an information processing device, an information processing method, and a storage medium that reduce an amount of data to be input to a neural network that determines a collision and suppress omission of data indicating a collision.

2. Description of Related Art

Japanese Unexamined Patent Application Publication No. 2017-010279 (JP 2017-010279 A) discloses an accident determination system. In the accident determination system, when an on-board device that transmits vehicle information to a management server predicts an accident, the on-board device transmits a signal to the management server. When accident determination information cannot be received from the on-board device within a predetermined period of time after the management server receives the signal, the accident determination system determines whether an accident has occurred using the vehicle information.

SUMMARY

The vehicle information may sometimes include data detected from a plurality of on-board devices mounted on the vehicle, and the amount of data may be enormous. Therefore, when the on-board device executes a process of determining whether a collision occurs with respect to the detected vehicle information, the computational complexity may become enormous and the computational cost may increase. Further, there is a possibility that, when the vehicle information is selected to reduce the calculation cost, the vehicle information indicating the collision may be lost.

The present disclosure provides an information processing device, an information processing method, and a storage medium capable of reducing an amount of data of vehicle information and suppressing omission of the vehicle information indicating a collision when a process of determining whether a collision occurs is executed with respect to the vehicle information.

An information processing device according to claim 1 includes: an acquiring unit that acquires vehicle information including acceleration of a vehicle, and a detection time at which the acceleration is detected; a deriving unit that derives an amount of change of the acceleration per unit time using the vehicle information; a setting unit that sets a threshold value of the amount of change in accordance with an interval of detection of the acceleration using the detection time; and an extracting unit that extracts the vehicle information corresponding to the amount of change as target data when the amount of change is equal to or larger than the threshold value.

The information processing device according to claim 1 acquires the vehicle information including the acceleration of the vehicle, and the detection time at which the acceleration is detected. The information processing device derives the amount of change of the acceleration per unit time using the vehicle information. The information processing device sets the threshold value of the amount of change in accordance with the interval of detection of the acceleration using the detection time. The information processing device extracts the vehicle information corresponding to the amount of change as the target data when the amount of change is equal to or larger than the threshold value. That is, the information processing device sets the threshold value corresponding to the interval of the detection time of the acceleration. When the amount of change of the acceleration per unit time is equal to or larger than the threshold value, the information processing device extracts the vehicle information corresponding to the amount of change as the target data. Accordingly, when the process of determining whether a collision occurs is executed with respect to the detected vehicle information, the information processing device can reduce the amount of data of the vehicle information and suppress the omission of the vehicle information indicating the collision.

In the information processing device according to claim 2, in the information processing device according to claim 1, the setting unit sets the threshold value to be larger as the interval becomes shorter.

According to the information processing device of claim 2, the vehicle information can be extracted without underestimating the amount of change of the derived acceleration.

In the information processing device according to claim 3, in the information processing device according to claim 2, the setting unit sets the threshold value derived by dividing the interval to a predetermined value.

According to the information processing device of claim 3, it is possible to more easily set the threshold value corresponding to the interval of detection of the acceleration.

In the information processing device according to claim 4, in the information processing device according to claim 2 or 3, the setting unit sets a lower limit value of the interval, and sets the threshold value when the interval is equal to or larger than the lower limit value.

According to the information processing device of claim 4, the vehicle information can be further reduced.

In the information processing device according to claim 5, in the information processing device according to any one of claims 1 to 4, the setting unit sets the threshold value using a learned model in which machine learning for determining the threshold value of the amount of change is performed using the vehicle information acquired in the past as learning data.

According to the information processing device of claim 5, the vehicle information can be extracted by reflecting data acquired in the past.

In the information processing device according to claim 6, in the information processing device according to any one of claims 1 to 5, the setting unit sets the threshold value of the amount of change in accordance with statistical information in which the vehicle information acquired in the past is collected.

According to the information processing device of claim 6, the vehicle information can be extracted by reflecting the data acquired in the past.

In an information processing method according to claim 7, a computer executes processes including: acquiring vehicle information including acceleration of a vehicle, and a detection time at which the acceleration is detected; deriving an amount of change of the acceleration per unit time using the vehicle information; setting a threshold value of the amount of change in accordance with an interval of detection of the acceleration using the detection time; and extracting the vehicle information corresponding to the amount of change as target data when the amount of change is equal to or larger than the threshold value.

The information processing method according to claim 7 includes acquiring the vehicle information including the acceleration of the vehicle, and the detection time at which the acceleration is detected. The information processing method includes deriving the amount of change of the acceleration per unit time using the vehicle information. The information processing method includes setting a threshold value of the amount of change in accordance with an interval of detection of the acceleration using the detection time. The information processing method includes extracting the vehicle information corresponding to the amount of change as target data when the amount of change is equal to or larger than the threshold value. That is, according to the information processing method, the threshold value corresponding to the interval of the detection time of the acceleration is set. When the amount of change of the acceleration per unit time is equal to or larger than the threshold value, the information processing device extracts the vehicle information corresponding to the amount of change as the target data, according to the information processing method. Accordingly, when the process of determining whether a collision occurs is executed with respect to the detected vehicle information, the information processing method can reduce the amount of data of the vehicle information and suppress the omission of the vehicle information indicating an accident.

A storage medium according to claim 8 includes an information processing program is executed by a computer, and the program includes: acquiring vehicle information including acceleration of a vehicle, and a detection time at which the acceleration is detected; deriving an amount of change of the acceleration per unit time using the vehicle information; setting a threshold value of the amount of change in accordance with an interval of detection of the acceleration using the detection time; and extracting the vehicle information corresponding to the amount of change as target data when the amount of change is equal to or larger than the threshold value.

The computer in which the information processing program stored in the storage medium according to claim 8 is executed acquires the vehicle information including the acceleration of the vehicle, and the detection time at which the acceleration is detected. The computer derives the amount of change of the acceleration per unit time using the vehicle information. The computer sets the threshold value of the amount of change in accordance with the interval of detection of the acceleration using the detection time. The computer extracts the vehicle information corresponding to the amount of change as the target data when the amount of change is equal to or larger than the threshold value. That is, according to the computer, the threshold value corresponding to the interval of the detection time of the acceleration is set. When the amount of change of the acceleration per unit time is equal to or larger than the threshold value, the computer extracts the vehicle information corresponding to the amount of change as the target data. Accordingly, when the computer executes the process of determining whether a collision with respect to on the detected vehicle information, it is possible to reduce the amount of data of the vehicle information and to suppress the omission of the vehicle information indicating an accident.

According to the present disclosure, when the process of determining whether a collision occurs is executed with respect to the detected vehicle information, the amount of data of the vehicle information can be reduced and the omission of the vehicle information indicating the collision can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An information processing system including the information processing device of the present disclosure will be described. The information processing system is a system that extracts data for detecting a collision of a vehicle by using information on driving of the vehicle (hereinafter, referred to as "vehicle information") acquired from an on-board unit mounted on the vehicle.

Overall Configuration

Figure 1:
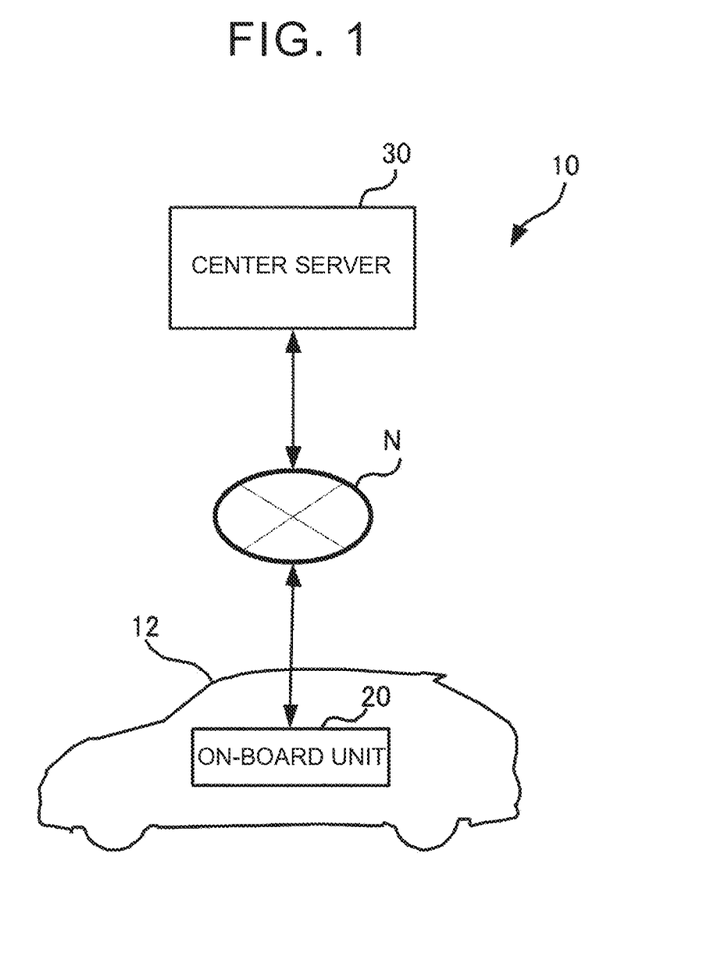
FIG. 1 is a diagram illustrating a schematic configuration of an information processing system according to each embodiment.

As illustrated in FIG. 1, an information processing system 10 according to an embodiment of the present disclosure includes a vehicle 12 and a center server 30 as an information processing device. The vehicle 12 is equipped with an on-board unit 20. The on-board unit 20 is mutually connected to the center server 30 through the network N.

In FIG. 1, one vehicle 12 including an on-board unit 20 is illustrated for one center server 30. However, the number of the vehicle 12, the on-board unit 20, and the center server 30 is not limited thereto.

The on-board unit 20 acquires vehicle information related to the operation of the vehicle 12 and transmits the vehicle information to the center server 30. Here, the vehicle information according to the present embodiment is data related to driving detected from each device mounted on the vehicle 12. For example, the vehicle information according to the present embodiment is time-series data including the acceleration of the vehicle and the time when the acceleration is detected (hereinafter, referred to as "detection time"). The detection time according to the present embodiment is a time. However, the form is not limited to this. The detection time may be, for example, an elapsed time elapsed from a reference point such as starting of the engine.

The center server 30 is installed in, for example, a manufacturer that manufactures the vehicle 12 or a car dealer affiliated with the manufacturer. The center server acquires vehicle information from the on-board unit 20, and extracts target data for detecting a collision of the vehicle from the acquired vehicle information. The extracted target data may be transmitted to an external device that detects a collision of the vehicle, or May be Stored as Target Data.

Vehicle

Figure 2:
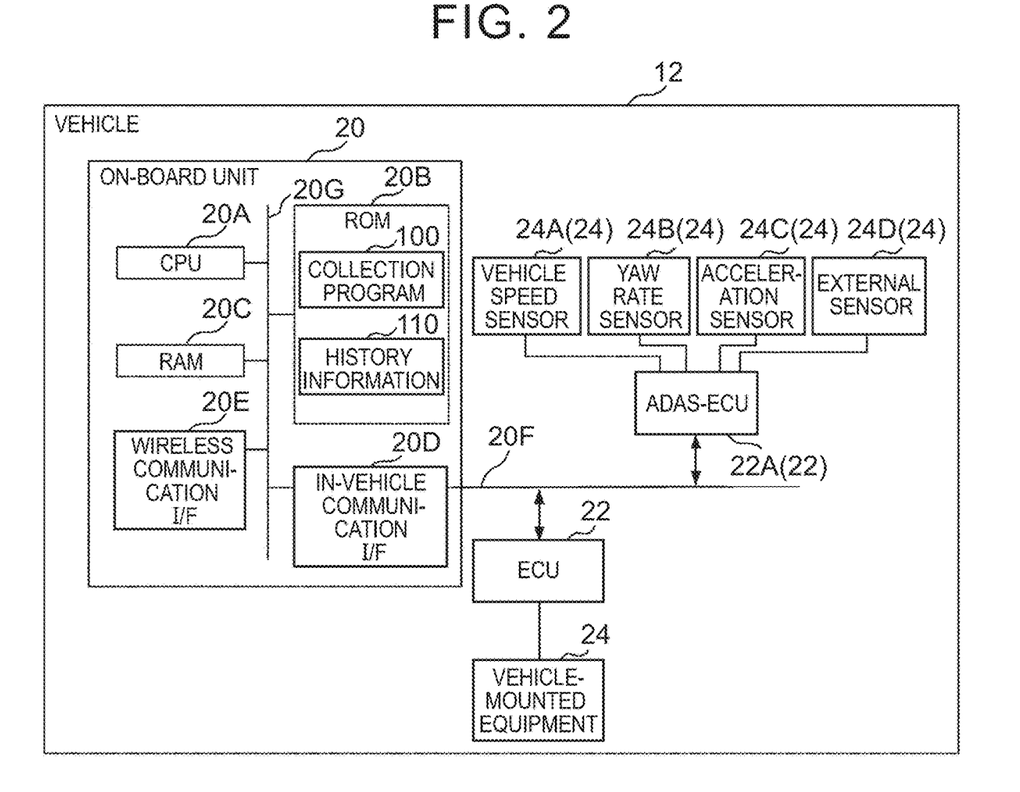
FIG. 2 is a block diagram illustrating a hardware configuration of a vehicle according to each embodiment.

As illustrated in FIG. 2, the vehicle 12 according to the present embodiment includes an on-board unit 20, a plurality of Electronic Control Unit (ECU) 22, and a plurality of in-vehicle devices 24.

The on-board unit 20 includes a Central Processing Unit (CPU) 20A, Read Only Memory (ROM) 20B, Random Access Memory (RAM) 20C, an in-vehicle communication Interface (UF) 20D, and a wireless communication OF 20E. CPU 20A, ROM 20B, RAM 20C, the in-vehicle communication OF 20D, and the wireless communication OF are communicably connected to each other via an inner-bus 20G.

CPU 20A is a central processing unit. CPU 20A executes various programs and controls each unit. That is, CPU 20A reads the program from ROM 20B and executes the program using RAM 20C as a working area.

ROM 20B stores various programs and various data. ROM 20B of the present embodiment stores a collection program 100 that collects vehicle information related to driving of the vehicle 12 from ECU 22. As CPU 20A executes the collection program 100, the on-board unit 20 executes a process of transmitting the vehicle information to the center server 30. In addition, ROM 20B stores history information 110 which is backup data of vehicle information. RAM 20C temporarily stores a program/data as a working area.

The in-vehicle communication OF 20D are interfaces for connecting to the respective ECU 22. For the interface, a communication standard based on a controller area network (CAN) protocol is used. The in-vehicle communication OF 20D is connected to an external buss 20F.

The wireless communication OF 20E is a wireless communication module for communicating with the center server 30. For the wireless communication module, for example, communication standards such as 5G, long term evolution (LTE), and Wi-Fi (registered trademark) are used. The wireless communication OF 20E is connected to the network N.

ECU 22 includes at least an Advanced Driver Assistance System (ADAS)-ECU 22A.

ADAS-ECU 22A performs overall control of the advanced driving support system. To ADAS-ECU 22A, a vehicle speed sensor 24A, a yaw rate sensor 24B, an acceleration sensor 24C, and an external sensor 24D that constitute the in-vehicle device 24 are connected. The vehicle speed sensor 24A is a sensor that detects the speed of the vehicle. The yaw rate sensor 24B is a sensor that detects an angular velocity in turning of the vehicle. The acceleration sensor 24C is a sensor that detects acceleration in the traveling direction of the vehicle. The external sensor 24D is a group of sensors used for detecting the surrounding environment of the vehicle 12. The external sensor 24D includes, for example, a camera that captures an image around the vehicle 12, a millimeter wave radar that transmits a probe wave and receives a reflected wave, and a Laser Imaging Detection and Ranging (LIDAR that scans the front of the vehicle 12.

Figure 3:
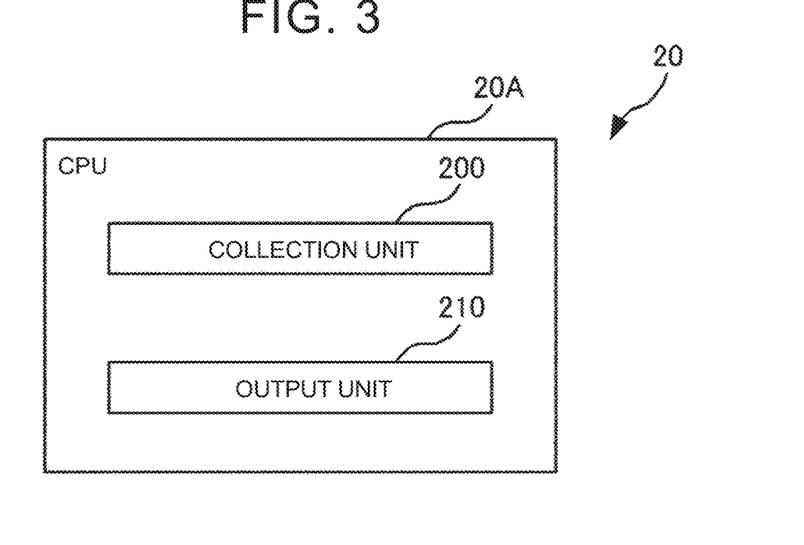
FIG. 3 is a block diagram illustrating a functional configuration of the on-board unit according to each embodiment.

As illustrated in FIG. 3, in the on-board unit 20 of the present embodiment, CPU 20A executes the collection program 100. As a result, CPU 20A functions as the collecting unit 200 and the outputting unit 210.

The collecting unit 200 has a function of acquiring information detected by the in-vehicle device 24 from the respective ECU 22 of the vehicle 12 and collecting the vehicle information.

The outputting unit 210 has a function of outputting the vehicle information collected by the collecting unit 200 to the center server 30.

Center Server

Figure 4:
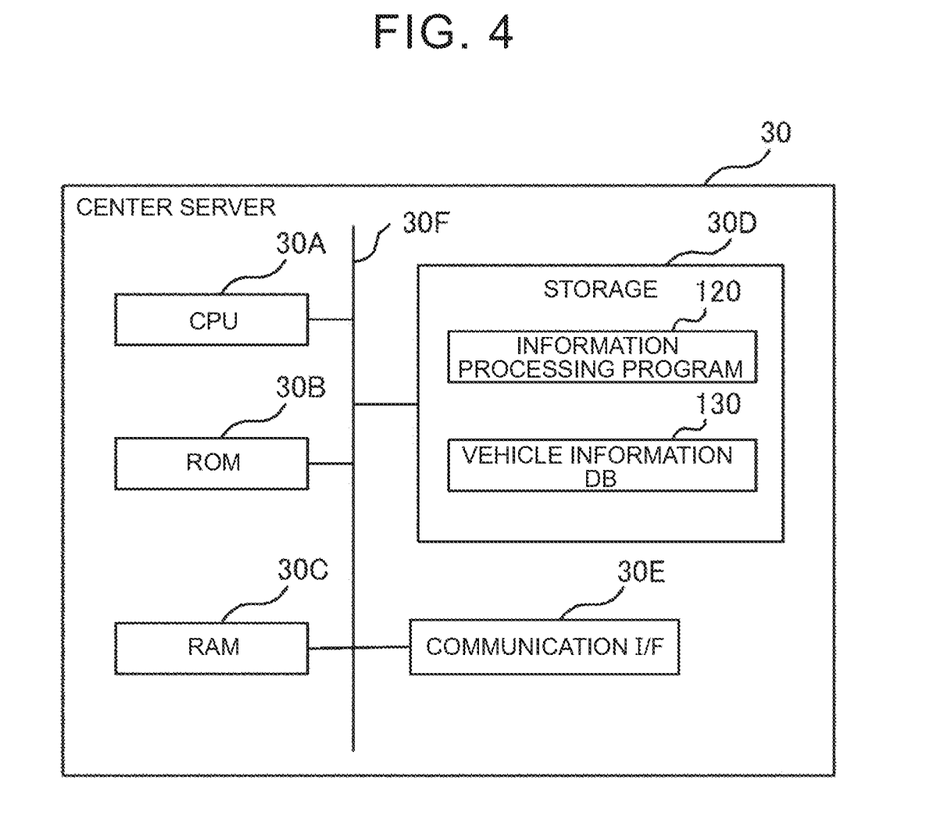
FIG. 4 is a block diagram illustrating a hardware configuration of a center server according to each embodiment.

As illustrated in FIG. 4, the center server 30 includes a CPU 30A, ROM 30B, RAM 30C, a storage 30D, and a communication OF 30E. CPU 30A, ROM 30B, RAM 30C, the storage 30D, and the communication OF 30E are communicably connected to each other via an internal-bus 30F. The functions of CPU 30A, ROM 30B, RAM 30C and the communication OF 30E are the same as those of CPU 20A, ROM 20B, RAM 20C and the wireless communication OF 20E of the on-board unit 20 described above. The communication OF 30E may perform wired communication.

A storage 30D as a memory is configured by Hard Disk Drive (HDD) or Solid State Drive (SSD). The storage 30D stores various programs and various data. The storage 30D of the present embodiment stores an information processing program 120 and a vehicle information database (hereinafter, referred to as "vehicle information DB") 130. ROM 30B may store the information processing program 120 and the vehicle-information DB130.

The information processing program 120 as a program is a program for controlling the center server 30. Upon execution of the information processing program 120, the center server 30 executes each process including a process of acquiring vehicle information and a process of extracting target data from the vehicle information.

The vehicle information DB130 stores the vehicle information received from the on-board unit 20 and the extracted target data.

Figure 5:
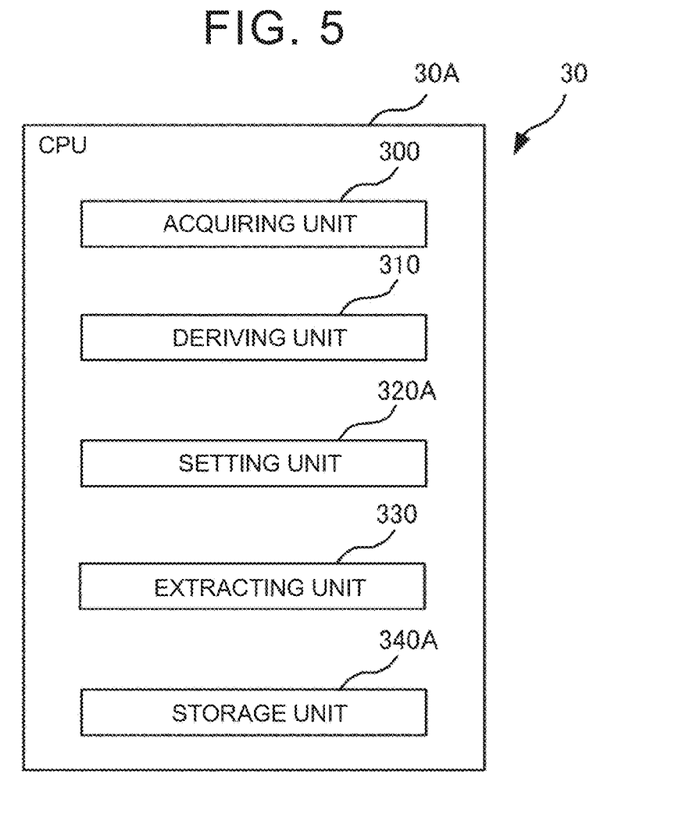
FIG. 5 is a block diagram illustrating a functional configuration of the center server according to the first embodiment.

As illustrated in FIG. 5, in the center server 30 of the present embodiment, CPU 30A executes the information processing program 120. Thus, the center server 30 functions as the acquiring unit 300, the deriving unit 310, the setting unit 320A, the extracting unit 330, and the storage unit 340A.

The acquiring unit 300 has a function of acquiring vehicle information transmitted from the on-board unit 20 of the vehicle 12. Here, the acquiring unit 300 according to the present embodiment acquires, as the vehicle information, time-series data including the acceleration and the detection time of the vehicle.

The deriving unit 310 derives an amount of change (jerk) of the acceleration per unit time in the vehicle 12 using the vehicle information. Specifically, the deriving unit 310 derives an interval (hereinafter, referred to as a "detection interval") at which the acceleration is detected using the detection time included in the vehicle information. The deriving unit 310 derives the jerk of the vehicle 12 by dividing the corresponding acceleration by the derived detection interval.

The setting unit 320A sets the jerk threshold values in accordance with the derived interval. Here, the jerk according to the present embodiment varies according to the detection interval.

Figure 6:
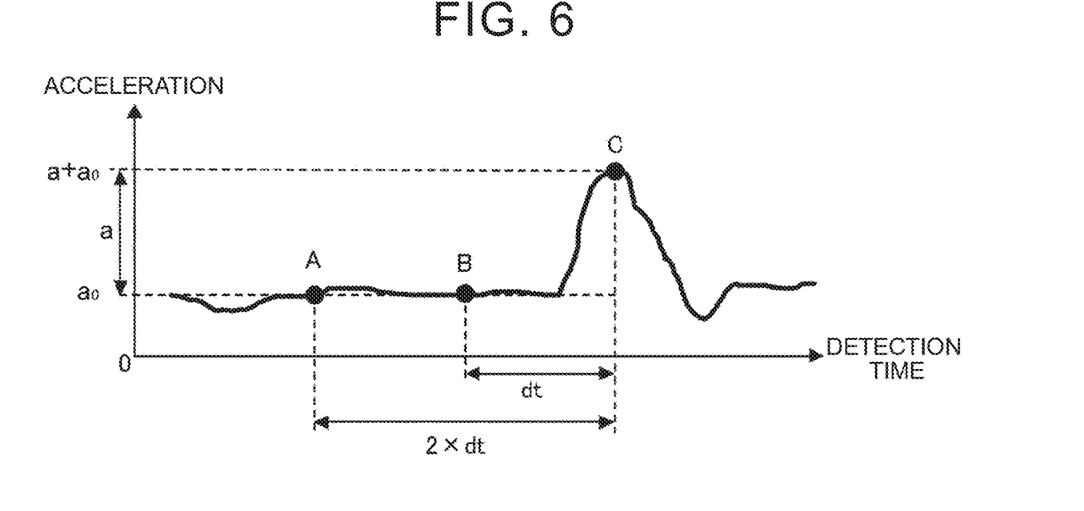
FIG. 6 is a block diagram illustrating a relationship between a detection time and an acceleration for describing setting of a threshold value according to each embodiment.

For example, as illustrated in FIG. 6, it is assumed that the difference between the detected accelerations between the detected point AC is "a" meters per second. Further, it is assumed that the difference between the detected accelerations between the detected point BC is "a" meters per second. Further, as shown in FIG. 6, it is assumed that the detection interval between AC is twice dt, and the detection interval between BC is dt.

The difference between the detected accelerations is divided by the respective detection intervals to derive and compare the jerks between AC and BC, respectively. The ratio of jerks between BC to jerks between AC is 2. That is, when the difference between the accelerations is the same, the more the detection interval is, the smaller the derived jerk is. Therefore, in the present embodiment, the setting unit 320A sets the jerk threshold values to be smaller as the detecting interval increases. Specifically, the setting unit 320A derives the threshold value by dividing the predetermined reference value by the derived detection interval. The setting unit 320A sets the derived threshold value as a jerk threshold. Accordingly, even when the value of the jerk decreases according to the detection interval, the target jerk is detected without missing.

In the present embodiment, as the detection interval decreases, the value of the derived jerk increases. Therefore, the setting unit 320A sets the jerk threshold values to be larger in accordance with the detected interval. However, if the detection interval is too small, the derived jerk becomes more frequent than the threshold value. Therefore, when the detected interval related to the vehicle information is equal to or larger than the predetermined interval (for example, 40 ms), the setting unit 320A sets the jerk threshold values and extracts the vehicle information. In other words, when the detected interval related to the vehicle information is less than the predetermined interval, the setting unit 320A does not set the jerk threshold values, and the on-board unit 20 does not extract the vehicle information.

Note that the predetermined reference value according to the present embodiment may be set by the user, or may be set by aggregating accelerations when a collision occurs by the setting unit 320A. For example, the setting unit 320A may set, as a predetermined reference value, a lower limit value of accelerations related to vehicle information in which a collision has occurred. In addition, the setting unit 320A totalizes accelerations generated when a collision occurs. The setting unit 320A may set a value (5th percentile) corresponding to the upper 95th percentile of the acceleration as a predetermined reference value by using the aggregated acceleration. In addition, the setting unit 320A may set a predetermined reference value using statistics such as a mean value, a median value, a variance, and a standard-deviation of the aggregated accelerations. The setting unit 320A may set a predetermined reference value according to the type of the vehicle.

The extracting unit 330 extracts vehicle information using the derived jerk and the set jerk threshold value. Specifically, when the derived jerk is equal to or larger than the threshold value, the extracting unit 330 extracts the vehicle information corresponding to the jerk as the target data.

The storage unit 340A is configured to store the extracted information. In addition, the storage unit 340A stores the acquired information.

Flow of Control

Figure 7:
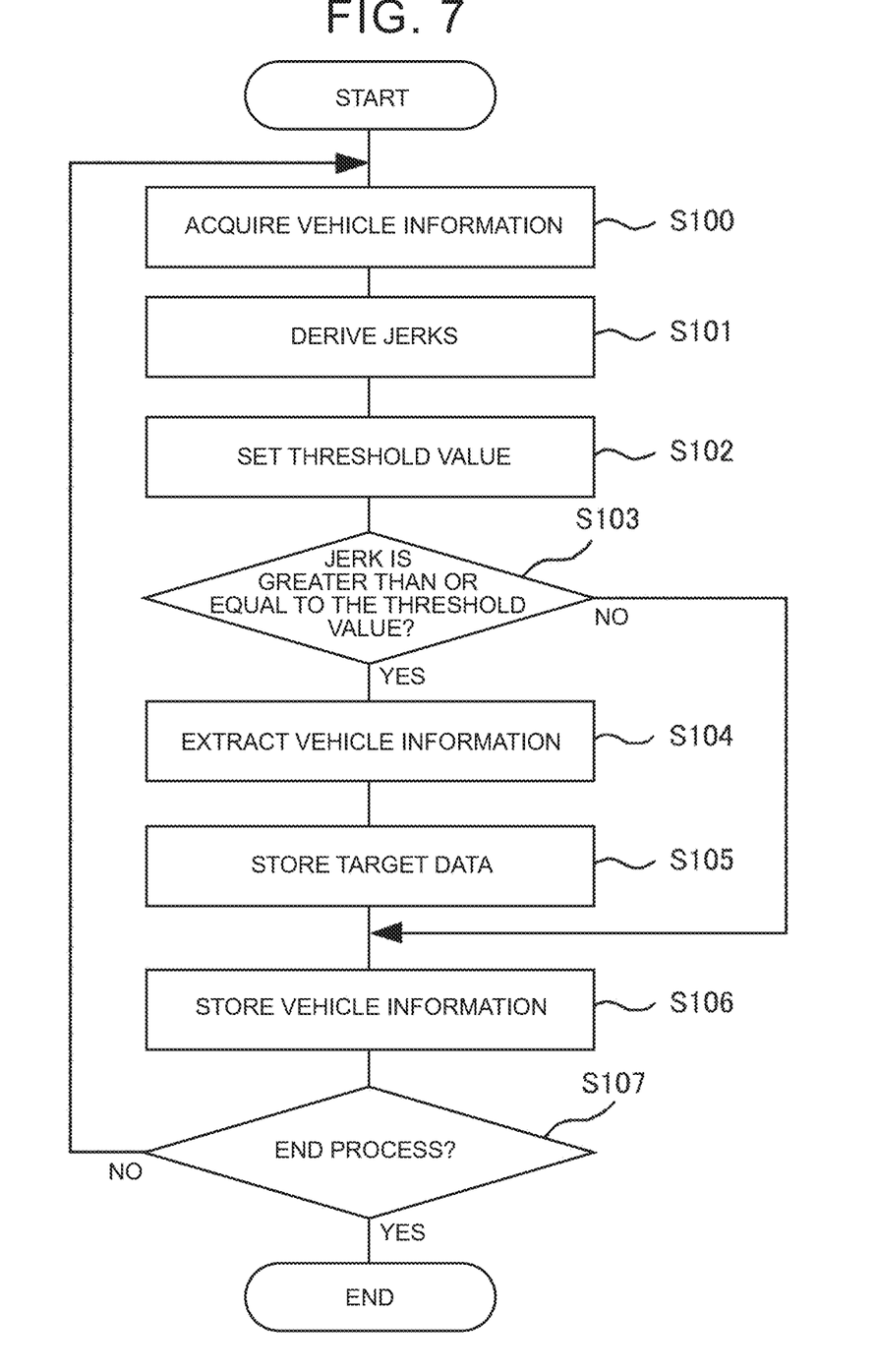
FIG. 7 is a flowchart illustrating a flow of a process of extracting vehicle information executed in the center server according to the first embodiment.

A flow of each process executed by the information processing system 10 of the present embodiment will be described with reference to a flowchart of FIG. 7. The respective processes in the center server 30 are executed by CPU 30A of the center server 30 functioning as the acquiring unit 300, the deriving unit 310, the setting unit 320A, the extracting unit 330, the storage unit 340A, and the generating unit 350. The process of extracting the vehicle information illustrated in FIG. 7 is executed, for example, when an instruction for extracting the vehicle information is input.

In step S100, CPU 30A acquires the vehicle data including the acceleration of the vehicle 12 and the detected times at which the acceleration is detected.

In step S101, CPU 30A uses the vehicle data to derive jerks of the vehicle 12.

In step S102, CPU 30A derives a jerk threshold by dividing the detected interval to a predetermined reference value, and sets a jerk threshold value.

In step S103, CPU 30A determines whether the jerk is greater than or equal to the threshold values. If the jerk is greater than or equal to the threshold value (step S103:YES), CPU 30A proceeds to step S104. On the other hand, if the jerk is not greater than or equal to the threshold value (jerk is less than the threshold) (step S103:NO), CPU proceeds to step S106.

In step S104, CPU 30A extracts the vehicle-information corresponding to the jerk.

In step S105, CPU 30A stores the extracted object data.

In step S106, CPU 30A stores the acquired vehicle-by-vehicle information.

In step S107, CPU 30A determines whether or not to terminate the process of extracting the vehicle-information. When the process of extracting the vehicle information is ended (step S107:YES), CPU 30A ends the process of extracting the vehicle information. On the other hand, when the process of extracting the vehicle information is not ended (step S107:NO), CPU 30A proceeds to step S100 and acquires the vehicle information.

Summary of the 1 Embodiment

The center server 30 as the information processing device of the present embodiment acquires vehicle information including the acceleration of the vehicle and the detection time when the acceleration is detected. The center server 30 derives the amount of change in acceleration per unit time using the vehicle information. The center server 30 uses the detection time to set a threshold value of the amount of change in accordance with the interval at which the acceleration is detected. When the amount of change is equal to or larger than the threshold value, the center server 30 extracts vehicle information corresponding to the amount of change as target data.

As described above, according to the present embodiment, in a case where the process of determining the presence or absence of a collision with respect to the detected vehicle information is executed, it is possible to reduce the amount of data of the vehicle information and suppress the missing of the vehicle information indicating the collision.

Second Embodiment

In the first embodiment, a configuration has been described in which a threshold value is derived and set by dividing a predetermined reference value by a detection interval. In the second embodiment, a mode in which a threshold value is set using a learned model in which machine learning for setting a threshold value is executed will be described.

Note that the configuration of the information processing system according to the present embodiment (see FIG. 1), an example of the hardware configuration of the vehicle 12 (see FIG. 2), an example of the functional configuration of the on-board unit 20 (see FIG. 3), an example of the hardware configuration of the center server 30 (see FIG. 4), and a graph (see FIG. 6) showing the relationship between the detection time and the acceleration are the same as those in the first embodiment. Therefore, description thereof will be omitted. Differences between the first embodiment and the second embodiment will be described below. In addition, the same components are denoted by the same reference numerals, and the description thereof will be omitted.

Figure 8:
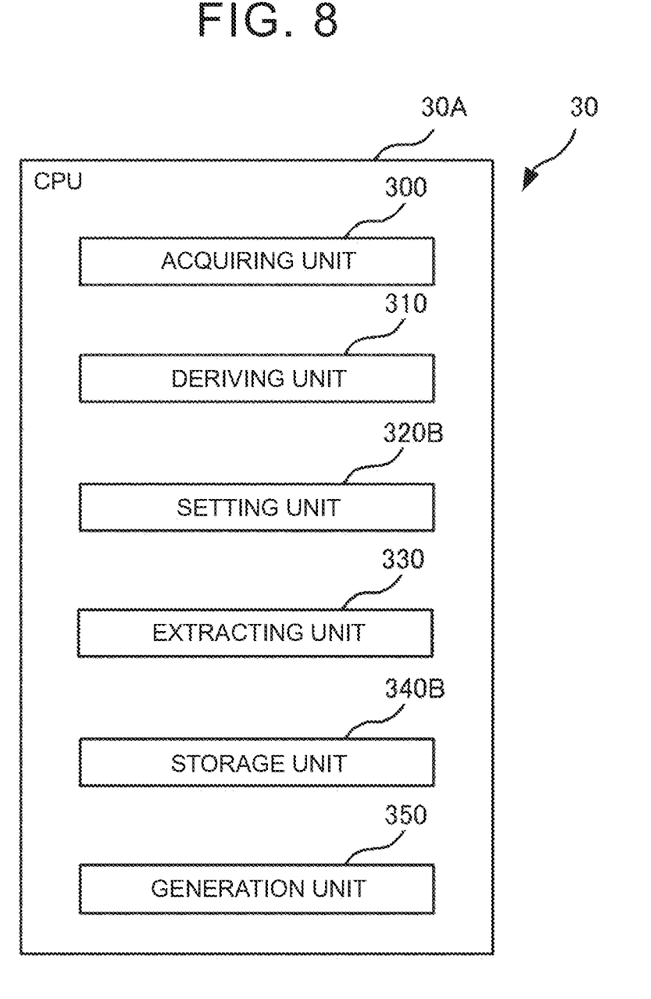
FIG. 8 is a block diagram illustrating a functional configuration of the center server according to the second embodiment.

As illustrated in FIG. 8, in the center server 30 of the present embodiment, CPU 30A executes the information processing program 120. Accordingly, the center server 30 functions as the acquiring unit 300, the deriving unit 310, the setting unit 320B, the extracting unit 330, the storage unit 340B, and the generating unit 350.

The setting unit 320B sets a jerk threshold value using a learned model that performs machine learning for setting a jerk threshold value. For example, the learned model learns vehicle information (acceleration) obtained in the past in which a collision has occurred as learning data. The learned model calculates, as a predetermined reference value, a value corresponding to the highest 95 percent (5th percentile) of the acceleration among all the acquired accelerations. The learned model is set by deriving a threshold value using a predetermined reference value. The learned model according to the present embodiment is, for example, a regression model.

The storage unit 340B stores the extracted information. The storage unit 340B stores the acquired information. Further, the storage unit 340B stores the learned model generated by the generating unit 350, which will be described later.

The generating unit 350 executes machine learning using vehicle information obtained in the past in which a collision has occurred, and generates a learned model.

Flow of Control

Figure 9:
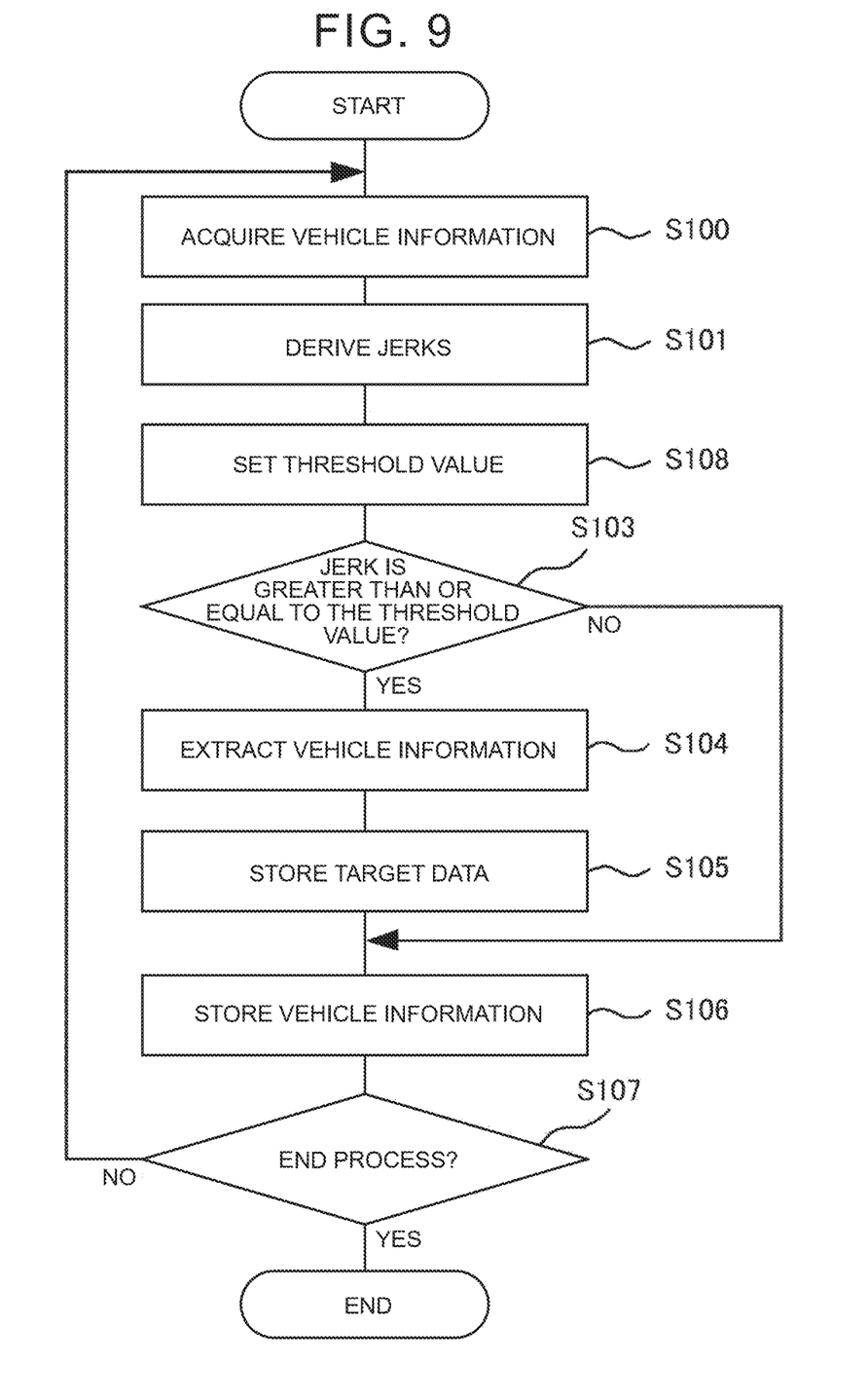
FIG. 9 is a flow chart showing a flow of a process of extracting vehicle-information executed in the center server according to the second embodiment.

The flow of each process executed by the information processing system 10 of the present embodiment will be described with reference to the flowchart of FIG. 9. The respective processes in the center server 30 are executed by CPU 30A of the center server 30 functioning as the acquiring unit 300, the deriving unit 310, the setting unit 320B, the extracting unit 330, and the storage unit 340B. The process of extracting the vehicle information illustrated in FIG. 9 is executed, for example, when an instruction for extracting the vehicle information is input. In FIG. 9, the same steps as those of the extraction process shown in FIG. 7 are denoted by the same reference numerals as those in FIG. 7, and the description thereof is omitted.

In step S108, CPU 30A inputs the acquired vehicle-information to the learned model. CPU 30A sets the threshold value of the jerk outputted from the learned model.

Figure 10:
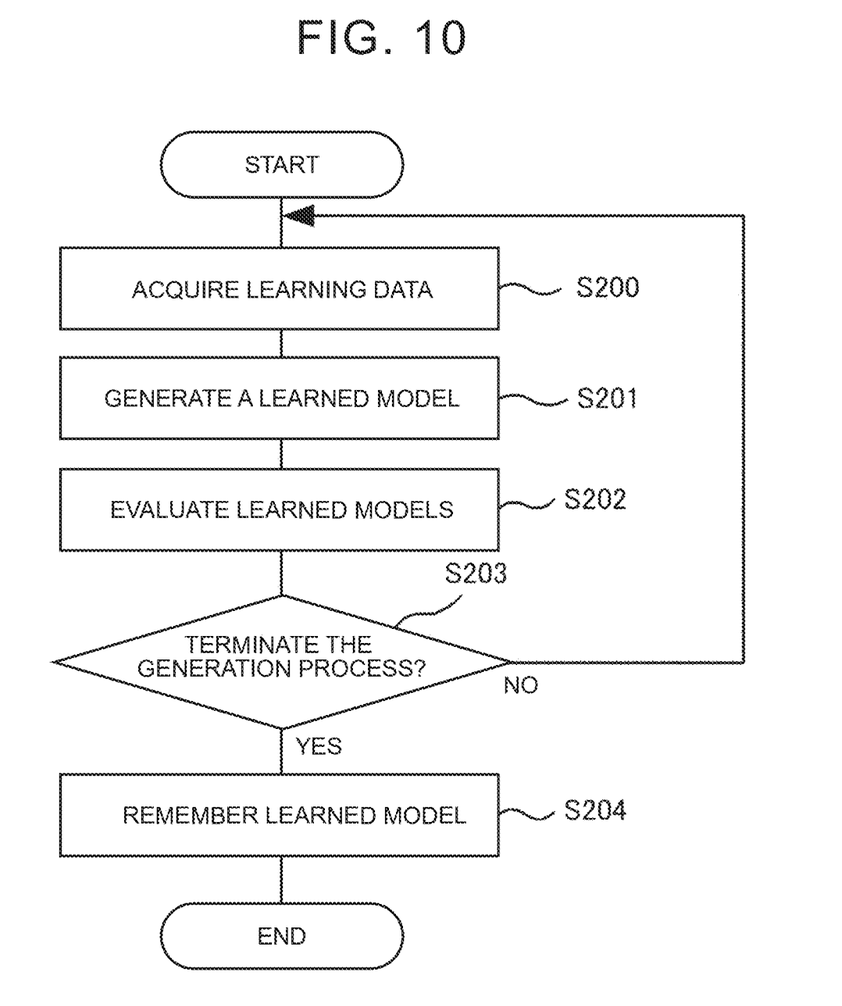
FIG. 10 is a flowchart illustrating a flow of a process of generating a learned model executed in the center server according to the second embodiment.

Next, a process of generating a learned model to be executed by the information processing system 10 according to the present embodiment will be described with reference to a flowchart of FIG. 10. The generation process illustrated in FIG. 10 is executed, for example, when an instruction to execute a process of generating a learned model is input.

In step S200, CPU 30A acquires, as the learning data, the vehicle information obtained in the past in which the collision of the vehicle occurred.

In step S201, CPU 30A performs machine learning using the acquired learning data to generate a learned model.

In step S202, CPU 30A inputs the vehicle-information into the generated learned model. CPU 30A then evaluates the learned model using the jerk threshold values outputted from the learned model.

In step S203, CPU 30A determines whether or not to terminate the process of generating the learned model. When the process of generating the learned model is terminated (step S203:YES), the process proceeds to step S204. On the other hand, if the process of generating the learned model is not terminated (step S203:NO), the process proceeds to step S200 in which CPU 30A acquires the learned data.

In step S204, CPU 30A stores the generated learned modeling.

SUMMARY

The center server 30 as the information processing device of the present embodiment uses the learned model to set a jerk threshold value and extracts vehicle information.

As described above, according to the present embodiment, vehicle information can be extracted by reflecting vehicle information acquired in the past.

Remarks

In the above embodiment, the configuration in which the center server 30 is equipped with the driving diagnosis apparatus has been described. However, the form is not limited to this. The information processing device may be the on-board unit 20. For example, the on-board unit 20 may extract vehicle information as target data using the vehicle information acquired from the in-vehicle device 24, and transmit the extracted target data to the center server 30 or the like.

Note that various processes executed by CPU 20A and CPU 30A by reading the software (program) in the above-described embodiment may be executed by various processors other than CPU. Examples of the processor include a Programmable Logic Device (PLD in which a circuit configuration can be changed after manufacturing of Field-Programmable Gate Array (FPGA, and the like, and a dedicated electric circuit that is a processor having a circuit configuration designed exclusively for executing a particular process such as Application Specific Integrated Circuit (ASIC, and the like. Each of the above-described processes may be executed by one of these various processors. Alternatively, the above-described process may be executed by a combination of two or more processors (for example, a plurality of FPGA and a combination of CPU and FPGA). Furthermore, the hardware structure of each of the various processors is, more specifically, an electric circuit in which circuit elements such as semiconductor elements are combined.

In the above embodiment, a state in which each program is stored (installed) in advance in a non-transitory computer-readable recording medium has been described. For example, the collection program 100 in the on-board unit 20 is stored in advance in ROM The information processing program 120 in the center server 30 is stored in advance in the storage 30D. However, the present disclosure is not limited thereto, and the programs may be provided in a form recorded in a non-transitory recording medium such as Compact Disc Read Only Memory (CD-ROM), Digital Versatile Disc Read Only Memory (DVD-ROM), and Universal Serial Bus (USB). Further, the program may be downloaded from an external device via a network.

The flow of processes described in the above embodiment is an example, and unnecessary steps may be deleted, new steps may be added, or the process order may be changed within a range that does not deviate from the gist.

What is claimed is:

1. An information processing device comprising:
a computer configured to:
acquire, offboard via wireless communication, vehicle information including acceleration of a vehicle, and a detection time at which the acceleration is detected;
derive an amount of change of the acceleration per unit time using the vehicle information;
set a threshold value of the amount of change of the acceleration per unit time in accordance with an interval of detection of the acceleration using the detection time;
extract the vehicle information corresponding to the amount of change of the acceleration per unit time as target data when the amount of change of the acceleration per unit time is equal to or larger than the threshold value; and
control the computer to reduce an amount of data of the vehicle information and suppress an omission of the vehicle information based on the extracted vehicle information indicating whether a collision has occurred.

2. The information processing device according to claim 1,
wherein the computer sets the threshold value to be larger as the interval becomes shorter.

3. The information processing device according to claim 2,
wherein the computer sets the threshold value derived by dividing the interval to a predetermined value.

4. The information processing device according to claim 2,
wherein the computer sets a lower limit value of the interval, and sets the threshold value when the interval is equal to or larger than the lower limit value.

5. The information processing device according to claim 1,
wherein the computer sets the threshold value using a learned model in which machine learning for determining the threshold value of the amount of change of the acceleration per unit time is performed using the vehicle information acquired in the past as learning data.

6. The information processing device according to claim 1,
wherein the computer sets the threshold value of the amount of change of the acceleration per unit time in accordance with statistical information in which the vehicle information acquired in the past is collected.

7. An information processing method executed by a computer, comprising:
acquiring offboard via wireless communication, vehicle information including acceleration of a vehicle, and a detection time at which the acceleration is detected;
deriving an amount of change of the acceleration per unit time using the vehicle information;
setting a threshold value of the amount of change of the acceleration per unit time in accordance with an interval of detection of the acceleration using the detection time; and
extracting the vehicle information corresponding to the amount of change of the acceleration per unit time as target data when the amount of change of the acceleration per unit time is equal to or larger than the threshold value; and
controlling to reduce an amount of data of the vehicle information and suppress an omission of the vehicle information based on the extracted vehicle information indicating whether a collision has occurred.

8. A non-transitory storage medium storing instructions, the instructions being executed by a computer a method, the method comprising:
acquiring offboard via wireless communication, vehicle information including acceleration of a vehicle, and a detection time at which the acceleration is detected;
deriving an amount of change of the acceleration per unit time using the vehicle information;
setting a threshold value of the amount of change of the acceleration per unit time in accordance with an interval of detection of the acceleration using the detection time; and
extracting the vehicle information corresponding to the amount of change of the acceleration per unit time as target data when the amount of change of the acceleration per unit time is equal to or larger than the threshold value; and
controlling to reduce an amount of data of the vehicle information and suppress an omission of the vehicle information based on the extracted vehicle information indicating whether a collision has occurred.

* * * * *